UNITED STATES PATENT OFFICE.

GUSTAV AUGUSTUS HENRY MULLER, OF MONTREAL, QUEBEC, CANADA.

LUMINOUS PAINT.

1,237,368.      Specification of Letters Patent.      Patented Aug. 21, 1917.

No Drawing.      Application filed June 8, 1916. Serial No. 102,505.

*To all whom it may concern:*

Be it known that I, GUSTAV AUGUSTUS HENRY MULLER, a subject of the King of Great Britain, and resident of 138 Milton street, in the city of Montreal, Province of Quebec, Dominion of Canada, have invented new and useful Improvements in Luminous Paints, of which the following is the specification.

The invention relates to improvements in luminous paints and the objects of the invention are to furnish a paint that will readily add to its luminosity by absorption during the daylight, so as to throw out striking and particularly distinct days of light in the darkness, to provide coloring effects for ornamentation purposes during the daytime without in any way minimizing the luminous properties of the paint at night and generally to make a cool luminant comparatively cheap to produce and very efficient in use, and it consists essentially of the ingredients mixed in the manner described in or about the proportions named and in the arrangements pointed out in the claims for novelty following.

In the manufacture of the luminous substance, the first step is one taken in most processes that of calcining clean white shells at a strong red heat and producing a caustic lime base, then two and one quarter pounds of caustic lime are boiled with one pound of sulfur in four gallons of water.

This is set aside in a covered vessel for a few days; then the liquid is poured off and the clear orange colored crystals are collected and let drain and dried on bibulous paper. The dried sulfid is then placed in a clean graphite crucible provided with a cover and heated for one half hour just short of redness and quickly for fifteen minutes at white heat, a small quantity of pure calcium fluorid being added to the sulfid before heating. The cover is then removed and the contents left in a clay retort until perfectly cold. The calcium fluorid, so added to the sulfid, has the effect of removing impurities from said sulfid, such as soda or potash remaining after the treatment of the shells. The fluorin during the heating combines with such impurities forming volatile products which are driven off by the heat, leaving the calcium to unite with sulfur, and thereby add more of the luminous compound to the product.

This luminous calcium sulfid is then mixed with various pigments and with barium sulfate. For different colors, the proportions vary also the ingredients to some extent, as for instance to produce blue, the base luminous calcium sulfid is mixed with barium sulfate and the pigments, ultramarine blue and cobalt blue.

For gray it is mixed with barium sulfate, calcium carbonate, ultramarine blue and sulfid zinc.

For green it is mixed with barium sulfate and green oxid chromium.

For red it is mixed with barium sulfate, madder lake and realgar.

For yellow it is mixed with barium sulfate and barium chromate.

In other colors the ingredients are somewhat different of course, though broadly similar to the mixtures described.

The proportions vary according to the color; however the barium sulfate runs about six to ten parts and the pigments from 5 to 8 according to the color and shade of color wanted.

The mixing of the base and coloring adjuncts may be accomplished in more than one way, such as roasting together or in any other manner that will insure a thorough intermingling of the parts.

What I claim is:—

1. In luminous paints, a base of luminous calcium sulfid produced by the treatment of caustic lime with sulfur and the subsequent heating with an agent which reacts with matter foreign to the calcium sulfid to form volatile compounds which are driven off by the heat.

2. In luminous paints, a base of luminous calcium sulfid produced by the treatment of caustic lime with sulfur and subsequent heating with calcium fluorid.

3. In luminous paints, a base of luminous calcium produced by the treatment of caustic lime with sulfur and subsequent purification by heating with calcium fluorid, and adjuncts mixed with said base for coloring purposes.

Signed at the city of Montreal, in Canada, this 6th day of June, 1916.

GUSTAV AUGUSTUS HENRY MULLER.

Witnesses:
E. J. FETHERSTONBAUGH,
GEORGE D. QUILLIAM.